United States Patent
Opusko et al.

(10) Patent No.: US 8,206,796 B2
(45) Date of Patent: Jun. 26, 2012

(54) MULTILAYER FILM COMPRISING POLYLACTIC ACID

(75) Inventors: Slawomir Opusko, Duncan, SC (US);
Paul A. Hughes, Greenville, SC (US);
Michael L. Becraft, Greer, SC (US);
Larry B. McAllister, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 929 days.

(21) Appl. No.: 11/418,583

(22) Filed: May 5, 2006

(65) Prior Publication Data
US 2007/0254118 A1    Nov. 1, 2007

Related U.S. Application Data

(60) Provisional application No. 60/795,632, filed on Apr. 27, 2006.

(51) Int. Cl.
*F16B 4/00* (2006.01)

(52) U.S. Cl. ...... 428/34.9; 428/34.1; 428/215; 428/511; 428/514; 428/537.1

(58) Field of Classification Search ............... 428/34.9, 428/34.1, 215, 511, 514, 537.1
See application file for complete search history.

(56) References Cited

U.S. PATENT DOCUMENTS

| | | | |
|---|---|---|---|
| 4,581,262 A | 4/1986 | Karabedian | |
| 4,585,679 A | 4/1986 | Karabedian | |
| 4,626,455 A | 12/1986 | Karabedian | |
| 4,938,683 A | 7/1990 | Boice | |
| 4,985,300 A | 1/1991 | Huang | |
| 4,987,186 A * | 1/1991 | Akiyama et al. | 525/107 |
| 5,252,642 A | 10/1993 | Sinclair et al. | |
| 5,534,606 A | 7/1996 | Bennett et al. | |
| 5,583,192 A | 12/1996 | Bennett et al. | |
| 5,648,443 A | 7/1997 | Okamoto et al. | |
| 5,658,625 A | 8/1997 | Bradfute et al. | |
| 5,714,573 A | 2/1998 | Randall et al. | |
| 5,756,651 A | 5/1998 | Chen et al. | |
| 5,766,748 A | 6/1998 | Ikado et al. | |
| 5,859,116 A | 1/1999 | Shih | |
| 5,866,634 A | 2/1999 | Tokushige et al. | |
| 5,866,675 A | 2/1999 | Ahmed et al. | |
| 5,908,918 A | 6/1999 | Chen et al. | |
| 5,922,832 A | 7/1999 | Randall et al. | |
| 6,005,019 A | 12/1999 | Liu | |
| 6,117,928 A | 9/2000 | Hiltunen et al. | |
| 6,153,276 A | 11/2000 | Oya et al. | |
| 6,262,184 B1 | 7/2001 | Kanamori et al. | |

(Continued)

FOREIGN PATENT DOCUMENTS

EP    0188374    7/1986

(Continued)

OTHER PUBLICATIONS

International Search Report mailed Nov. 8, 2007 for PCT/US2007/009994.

(Continued)

*Primary Examiner* — Brent Ohern
(74) *Attorney, Agent, or Firm* — Daniel B. Ruble

(57) ABSTRACT

An article comprises a first polylactic acid layer and a second layer directly adjacent the first layer. The second layer comprises any of ethylene/unsaturated ester copolymer, ethylene/alkyl (meth)acrylate/glycidyl (meth)acrylate copolymer, and styrenic block copolymer. The article may be a shrink sleeve.

32 Claims, 1 Drawing Sheet

U.S. PATENT DOCUMENTS

| | | |
|---|---|---|
| 6,406,763 B1 | 6/2002 | Wolf et al. |
| 6,423,421 B1 | 7/2002 | Banaszak et al. |
| 6,479,138 B1 | 11/2002 | Childress |
| 6,495,631 B1 | 12/2002 | Randall et al. |
| 6,521,336 B2 | 2/2003 | Narita et al. |
| 6,544,607 B1 | 4/2003 | Kuroki et al. |
| 6,583,232 B1 | 6/2003 | Brown |
| 6,660,211 B2 | 12/2003 | Topolkaraev et al. |
| 6,709,761 B2 | 3/2004 | Hirose et al. |
| 6,720,374 B2 | 4/2004 | Sahida et al. |
| 6,803,443 B1 | 10/2004 | Ariga et al. |
| 6,852,806 B2 | 2/2005 | Sasagawa et al. |
| 6,855,406 B2 | 2/2005 | Takayasu et al. |
| 6,869,985 B2 | 3/2005 | Mohanty et al. |
| 6,872,462 B2 | 3/2005 | Roberts et al. |
| 6,905,759 B2 | 6/2005 | Topolkaraev et al. |
| 6,943,214 B2 | 9/2005 | Flexman |
| 6,960,374 B1 | 11/2005 | Terada et al. |
| 7,160,604 B2 | 1/2007 | Ginossatis |
| 7,354,973 B2 | 4/2008 | Flexman |
| 2002/0192412 A1 | 12/2002 | Satani et al. |
| 2003/0021973 A1 | 1/2003 | Topolkaraev et al. |
| 2003/0039775 A1 | 2/2003 | Kong |
| 2003/0068453 A1 | 4/2003 | Kong |
| 2003/0083440 A1 | 5/2003 | Sahida et al. |
| 2003/0119959 A1 | 6/2003 | Inayama et al. |
| 2003/0152792 A1 | 8/2003 | Takayasu et al. |
| 2003/0204017 A1 | 10/2003 | Stevens et al. |
| 2004/0053003 A1* | 3/2004 | Coates et al. .................. 428/98 |
| 2004/0072002 A1 | 4/2004 | Hashioka et al. |
| 2004/0121172 A1* | 6/2004 | Hofmann .................. 428/483 |
| 2004/0225065 A1 | 11/2004 | Inayama et al. |
| 2004/0230001 A1 | 11/2004 | Flexman |
| 2005/0131120 A1 | 6/2005 | Flexman |
| 2005/0136259 A1 | 6/2005 | Mohanty |
| 2005/0142313 A1 | 6/2005 | Hatley |
| 2005/0154114 A1 | 7/2005 | Hale |
| 2005/0159583 A1 | 7/2005 | Imamura |
| 2005/0182201 A1 | 8/2005 | Matsumoto |
| 2005/0221032 A1 | 10/2005 | Yamane et al. |
| 2005/0227099 A1 | 10/2005 | Hiruma |
| 2005/0228092 A1 | 10/2005 | Fujita |
| 2005/0281997 A1* | 12/2005 | Grah .................. 428/215 |
| 2006/0105166 A1 | 5/2006 | Lischefski et al. |
| 2006/0275564 A1 | 12/2006 | Grah et al. |
| 2007/0098933 A1 | 5/2007 | Opuszko et al. |
| 2007/0196600 A1* | 8/2007 | Hutchinson et al. ......... 428/34.1 |
| 2007/0255013 A1 | 11/2007 | Becraft et al. |
| 2007/0270553 A1 | 11/2007 | Bohm et al. |
| 2008/0026170 A1 | 1/2008 | Yamada et al. |
| 2008/0050603 A1 | 2/2008 | Randall et al. |
| 2008/0197540 A1 | 8/2008 | McAllister et al. |

FOREIGN PATENT DOCUMENTS

| | | |
|---|---|---|
| EP | 0189986 | 8/1986 |
| EP | 1 153 743 A1 | 11/2001 |
| EP | 1 355 985 | 8/2002 |
| EP | 1 302 509 | 4/2003 |
| EP | 1 340 690 | 9/2003 |
| EP | 1 454 958 | 9/2004 |
| EP | 1 473 324 | 11/2004 |
| EP | 1 491 585 A1 | 12/2004 |
| EP | 1 619 021 A1 | 1/2006 |
| EP | 1 728 816 A2 | 12/2006 |
| EP | 1 810 821 A | 7/2007 |
| EP | 1 810 821 A1 | 7/2007 |
| JP | 2003-147264 | 5/2003 |
| JP | 2003-160202 | 6/2003 |
| JP | 2003-313404 | 11/2003 |
| JP | 2004-058586 | 2/2004 |
| JP | 2004-217289 | 8/2004 |
| JP | 2004-262029 | 9/2004 |
| JP | 2004-351629 | 12/2004 |
| JP | 2004-358721 | 12/2004 |
| JP | 2005-002199 | 1/2005 |
| JP | 2005-002201 | 1/2005 |
| JP | 2005-007610 | 1/2005 |
| JP | 2005-028615 | 2/2005 |
| WO | 00/01426 | 1/2000 |
| WO | WO 03/016053 A | 2/2003 |
| WO | WO 2004/067604 | 8/2004 |
| WO | 2005/061628 A1 | 7/2005 |
| WO | 2005/066248 A1 | 7/2005 |
| WO | 2006/002372 A2 | 1/2006 |
| WO | WO 20067/121118 A | 11/2006 |
| WO | WO 2007/058783 A1 | 5/2007 |

OTHER PUBLICATIONS

Hartmann & Whiteman "Polylactide, a New Thermoplastic for Extrusion Coating" Cargill-Dow ANTEC (Jan. 2001).

"Review of Coextrudable Adhesive R&D for PLA and PE Conducted by NatureWorks LLC" NatureWorks Technical Fact Sheet (Sep. 2005).

"NatureWorks PLA Polymer 4060D for Heat Seal Layer in Coextruded Oriented Films" Technical Technical Bulletin (Jan. 2005).

"NatureWorks PLA Film Technical Bulletin: Printing and Laminating" Technical Bulletin (Jan. 2006).

Ljungberg et al. "Film Extrusion and Film Weldability of PLA Plasticised with Triacetine and Tributyl Citrate" J. Applied Polymer Sci. 88, No. 14, p. 3239-47 (Jun. 28, 2003).

\* cited by examiner

MULTILAYER FILM COMPRISING POLYLACTIC ACID

This application claims priority from and the benefit of U.S. Provisional Patent Application Ser. No. 60/795,632 filed Apr. 27, 2006 and entitled "Multilayer Film Comprising Polylactic Acid", which is incorporated herein in its entirety by reference.

BACKGROUND OF THE INVENTION

The present invention relates to articles comprising polylactic acid, such as multiple layer films.

Polylactic acid is a polymer that provides some environmental advantages because it is biodegradable and also may be manufactured from renewable-resource feedstock (e.g., corn). It may be desirable to incorporate polylactic acid in a multiple layer article such as a film. In such cases, the bond strength between the layers should be sufficiently strong for use in the desired application.

SUMMARY OF THE INVENTION

One or more embodiments of present invention may address one or more of the aforementioned problems.

In one embodiment, an article comprises first and second layers. The first layer comprises polylactic acid. The second layer is directly adjacent the first layer. The second layer comprising ethylene/unsaturated ester copolymer, wherein the unsaturated ester comonomer content of the ethylene/unsaturated ester copolymer is at least about 35 wt. % based on the weight of the second layer.

In another embodiment, an article comprises first and second layers. The first layer comprises polylactic acid. The second layer is directly adjacent the first layer. The second layer comprises ethylene/alkyl (meth)acrylate/glycidyl (meth)acrylate copolymer, wherein the unsaturated ester comonomer content of the ethylene/alkyl (meth)acrylate/glycidyl (meth)acrylate copolymer is at least about 30 wt. % based on the weight of the second layer.

In another embodiment, an article comprises first and second layers. The first layer comprises polylactic acid. The second layer is directly adjacent the first layer. The second layer comprises at least about 30 wt. %, by the weight of the second layer, of styrenic block copolymer comprising at most about 73 wt. % styrene comonomer content based on the weight of the second layer.

In another embodiment, a shrink sleeve comprises a film comprising first, second, and third layers. The first layer comprises polylactic acid. The second layer is directly adjacent the first layer. The second layer comprising ethylene/unsaturated ester copolymer, wherein the unsaturated ester comonomer content of the ethylene/unsaturated ester copolymer is at least about 20 wt. % based on the weight of the ethylene/unsaturated ester copolymer. The third layer is directly adjacent the second layer. The third layer comprises less than about 50 wt. % polylactic acid, based on the weight of the third layer. The film has a free shrink at 100° C. in at least one direction of at least about 10%.

The embodiments of the invention will be more readily understood and appreciated by reference to the drawings and detailed description herein.

DETAILED DESCRIPTION OF THE INVENTION

Figure 1:
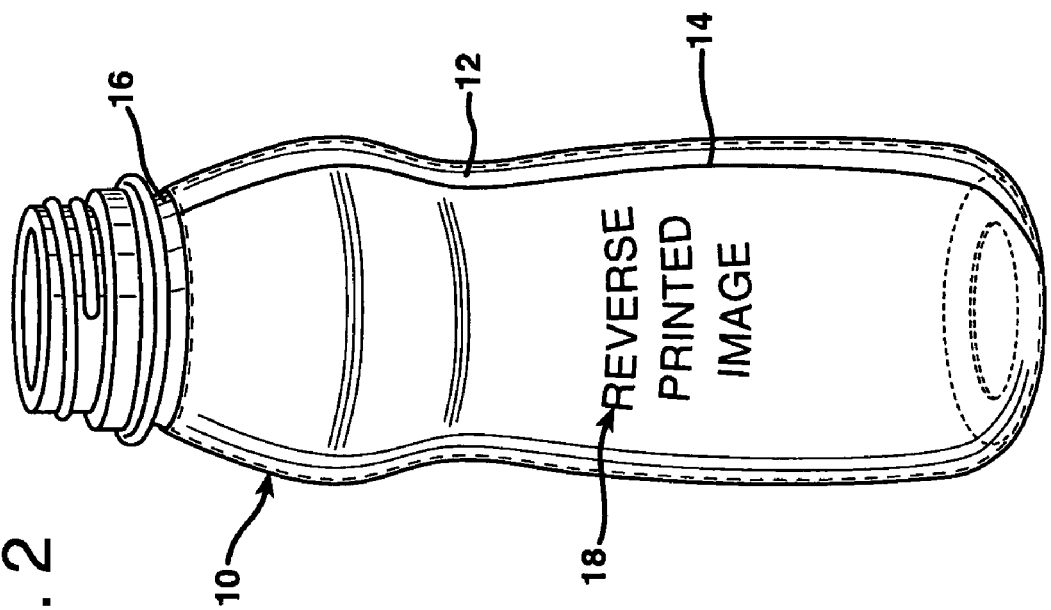
FIG. 1 is a representative perspective view of a shrink sleeve comprising an embodiment of the film of the present invention surrounding a container.

An article (e.g., a film) comprises first and second layers. The first layer comprises polylactic acid. The second layer is directly adjacent the first layer. The second layer may comprise ethylene/unsaturated ester copolymer, ethylene/alkyl (meth)acrylate/glycidyl (meth)acrylate copolymer, and/or styrenic block copolymer. A third layer may be directly adjacent the second layer. A first layer is "directly adjacent" to a second layer if there is no intervening layer, such as an adhesive layer, between the first and second layers.

Polylactic Acid

The first layer comprises polylactic acid. Polylactic acid includes:

(i) homopolymers of lactic acid, including poly(L-lactic acid) in which the monomer unit is L-lactic acid, poly(D-lactic acid) in which the monomer unit is D-lactic acid, and poly(D,L-lactic acid) in which the monomer structure units are D,L-lactic acid, that is, a mixture in various proportions (e.g., a racemic mixture) of D-lactic acid and L-lactic acid monomer units; and (ii) copolymers of lactic acid comprising at least about 50 wt. % lactic acid comonomer content based on the weight of the copolymer, for example, at least about any of the following wt. % amounts of lactic acid comonomer content: 60, 70, 80, 90 wt. %, and comprising one or more comonomers other than lactic acid comonomer in amounts of less than about any of the following amounts: 50, 30, 20, and 10 wt. %, by weight of the copolymer. Exemplary comonomers include hydroxycarboxylic acids other than lactic acid, for example, one or more of any of the following hydroxycarboxylic acids: glycolic acid, hydroxybutyrate (e.g., 3-hydroxybutyric acid, 4-hydroxybutyric acid), hydroxyvaleric acid (e.g., 4-hydroxyvaleric acid, 5-hydroxyvaleric acid) and hydroxycaproic acid (e.g., 6-hydroxycaproic acid).

Polylactic acid may be made, for example, by polycondensation methods. In the polycondensation method, for example, L-lactic acid, D-lactic acid, or a mixture of these, or lactic acid and one or more other hydroxycarboxylic acids, may be directly subjected to dehydropolycondensation to obtain a polylactic acid of desired composition. For example, in the direct dehydration polycondensation process the lactic acid or other hydroxycarboxylic acids may be subjected to azeotropic dehydration condensation in the presence of an organic solvent, such as a diphenyl ether-based solvent. Such polymerization reaction, for example, may progress by removing water from the azeotropically distilled solvent and returning substantially anhydrous solvent to the reaction system.

Polylactic acid may also be made by ring-opening polymerization methods. In the ring-opening polymerization method, lactide (i.e., cyclic dimer of lactic acid) may be subjected to polymerization by the aid of a polymerization-adjusting agent and a catalyst to obtain polylactic acid. Lactide includes L-lactide (i.e., dimer of L-lactic acid), D-lactide (i.e., dimer of D-lactic acid), DL-lactide (i.e., mixture of L- and D-lactides), and meso-lactide (i.e., cyclic dimer of D- and L-lactic acids). These isomers can be mixed and polymerized to obtain polylactic acid having a desired composition and crystallinity. Any of these isomers may also be copolymerized by ring-opening polymerization with other cyclic dimers (e.g., glycolide, a cyclic dimer of glycolic acid) and/or with cyclic esters such as caprolactone, propiolactone, butyrolactone, and valerolactone.

The weight average molecular weight of polylactic acid used in any embodiments of the present invention may be at least about any of the following: 5,000, 10,000, 15,000, 30,000, and 100,000; and may be at most about any of the following: 250,000, 300,000, 400,000, and 1,000,000. Commercially available polylactic acids include those sold by NatureWorks LLC (owned by Cargill Corporation), such as those sold under the NatureWorks PLA 4032, 4042, and 4060 trade names. It is believed that the PLA 4032 grade has a D isomer monomer content of from 1.2 to 1.6 wt. %, that the PLA 4042 grade has a D isomer monomer content of from 3.7 to 4.8 wt. %, and the PLA 4060 grade has a D isomer monomer content of from 11.0 to 13.0 wt. %.

The first layer may comprise at least about any of the following amounts of polylactic acid (e.g., any specific type of polylactic acid described herein): 50, 60, 70, 80, and 90 wt. %, based on the weight of the first layer; and may comprise at most about any of the following amounts of polylactic acid (e.g., any specific type of polylactic acid described herein): 100, 95, 90, 80, 70, and 60 wt. %, based on the weight of the first layer. The first layer may consist of, or consist essentially of, polylactic acid.

The first layer may comprise poly(hydroxycarboxylic acid) other than polylactic acid in an amount less than about any of the following: 40, 30, 20, 10, 5, and 1 wt. %, based on the weight of the first layer. The first layer may be essentially free of poly(hydroxycarboxylic acid) other than polylactic acid.

Ethylene/Unsaturated Ester Copolymer

The second layer may comprise ethylene/unsaturated ester copolymer. Ethylene/unsaturated ester copolymer includes copolymers of ethylene and one or more unsaturated ester monomers. Useful unsaturated esters include:

1) vinyl esters of aliphatic carboxylic acids, where the esters have from 4 to 12 carbon atoms, 2) alkyl esters of acrylic or methacrylic acid (collectively, "alkyl (meth)acrylate"), where the esters have from 4 to 12 carbon atoms, and 3) glycidyl esters of acrylic or methacrylic acid (collectively, "glycidyl (meth)acrylate"). The ethylene/unsaturated ester copolymer may comprise a mixture of the second and third types of comonomers, for example to form an ethylene/alkyl (meth)acrylate/glycidyl (meth)acrylate copolymer.

Representative examples of the first ("vinyl ester") group of monomers include vinyl acetate, vinyl propionate, vinyl hexanoate, and vinyl 2-ethylhexanoate. The vinyl ester monomer may have at least any of the following number of carbon atoms: 4, 5, and 6 carbon atoms; and may have at most any of the following number of carbon atoms: 4, 5, 6, 8, 10, and 12 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have at least any of the following number of carbon atoms: 4, 5, and 6 carbon atoms; and may have at most any of the following number of carbon atoms: 4, 5, 6, 8, 10, and 12 carbon atoms.

Representative examples of the third ("glycidyl (meth)acrylate") group of monomers include glycidyl acrylate and glycidyl methacrylate ("GMA").

The ethylene/unsaturated ester copolymer may comprise (i) vinyl ester of aliphatic carboxylic acid comonomer content of any one or more of the above listed types of vinyl esters of aliphatic carboxylic acids and/or (ii) alkyl (meth)acrylate comonomer content of any one or more of the above listed types of alkyl (meth)acrylates in at least about any of the following amounts (based on the weight of the copolymer): 5, 10, 15, 20, 22, 23, 24, 25, 26, 27, 28, 29, 30, 32, 34, 36, 38, 40, 45, 50, 55, and 60 wt. %; and at most about any of the following amounts (based on the weight of the copolymer): 10, 15, 20, 25, 26, 27, 28, 29, 30, 32, 34, 36, 38, 40, 45, 50, 55, 60, 65, 70, 75, and 80 wt. %.

The ethylene/unsaturated ester copolymer may comprise glycidyl (meth)acrylate comonomer content (e.g., any one or more of the above listed types of glycidyl (meth)acrylates) in at least about any of the following amounts (based on the weight of the copolymer): 0.5, 1, 2, 3, 4, 5, 6, 7, 8, 9, and 10 wt. %; and at most about any of the following amounts (based on the weight of the copolymer): 1, 2, 3, 4, 5, 6, 7, 8, 9, 10, and 12 wt. %.

The unsaturated ester comonomer content (e.g., the vinyl ester, alkyl (meth)acrylate, and/or glycidyl (meth)acrylate comonomer content) of the ethylene/unsaturated ester copolymer may collectively total at least about any of the following amounts (based on the weight of the copolymer): 20, 22, 23, 25, 26, 27, 28, 29, 30, 32, 34, 36, 38, 40, 45, 50, 55, and 60 wt. %; and may collectively total at most about any of the following amounts (based on the weight of the copolymer): 30, 32, 34, 36, 38, 40, 45, 50, 55, 60, 65, 70, 75, and 80 wt. %.

The unsaturated ester comonomer content (e.g., the vinyl ester, alkyl (meth)acrylate, and/or glycidyl (meth)acrylate comonomer content) of the ethylene/unsaturated ester copolymer in the second layer may collectively total at least about any of the following amounts (based on the weight of the second layer): 30, 32, 34, 35, 36, 37, 38, 39, 40, 42, 43, 45, 50, 55, and 60 wt. %; and may collectively total at most about any of the following amounts (based on the weight of the second layer): 30, 32, 34, 36, 38, 40, 45, 50, 55, 60, 65, 70, 75, and 80 wt. %.

For example, if the second layer comprises 50% (by weight of the layer) ethylene/vinyl acetate copolymer having 60% vinyl acetate content (by weight of the copolymer), 20% (by weight of the layer) ethylene/vinyl acetate copolymer having 30% vinyl acetate content (by weight of the copolymer), and 20% polyethylene, then the unsaturated ester comonomer content of the ethylene/unsaturated ester copolymer in the second layer (by weight of the second layer) is 36 wt. % (i.e., 0.5×(60%)+0.2×(30%)+0.2×(0%)=36%).

The ethylene monomer content of the ethylene/unsaturated ester copolymer may be at least about, and/or at most about, any of the following (based on the weight of the copolymer): 45, 50, 55, 60, 65, 70, and 80 wt. %.

The ethylene/unsaturated ester copolymer of the second layer may comprise one or more of any of the types of ethylene/unsaturated ester copolymers described herein. For example, the ethylene/unsaturated ester copolymer of the second layer may consist essentially of three, two, or one of the types of ethylene/unsaturated ester copolymers described herein. For example, the second layer may comprise ethylene/unsaturated ester copolymer consisting essentially of any one or more of the ethylene/unsaturated ester copolymers described herein. For example, the second layer may comprise ethylene/unsaturated ester copolymer consisting essentially of ethylene/alkyl (meth)acrylate/glycidyl (meth)acrylate copolymer.

Representative examples of ethylene/unsaturated ester copolymers include:
ethylene/vinyl acetate,
ethylene/methyl acrylate,
ethylene/methyl methacrylate,
ethylene/ethyl acrylate,
ethylene/ethyl methacrylate,
ethylene/butyl acrylate,
ethylene/2-ethylhexyl methacrylate,
ethylene/glycidyl acrylate,
ethylene/glycidyl methacrylate (e.g., that available from Arkema Corporation under the LOTADER 8840 trade name, believed to have 8 wt. % GMA monomer content),
ethylene/methyl acrylate/glycidyl acrylate,
ethylene/methyl methacrylate/glycidyl acrylate,
ethylene/ethyl acrylate/glycidyl acrylate,
ethylene/ethyl methacrylate/glycidyl acrylate,
ethylene/butyl acrylate/glycidyl acrylate,
ethylene/2-ethylhexyl methacrylate/glycidyl acrylate,
ethylene/methyl acrylate/glycidyl methacrylate (e.g., that available from Arkema Corporation under the LOTADER 8900 trade name, believed to have about 24 wt. % methyl acrylate monomer content and about 8 wt. % GMA monomer content),
ethylene/methyl methacrylate/glycidyl methacrylate,
ethylene/ethyl acrylate/glycidyl methacrylate,
ethylene/ethyl methacrylate/glycidyl methacrylate,
ethylene/butyl acrylate/glycidyl methacrylate (e.g., that available from Arkema Corporation under the LOTADER AX 8999 trade name, believed to have 28 wt. % butyl acrylate monomer content and 1 wt. % GMA monomer content), and
ethylene/2-ethylhexyl methacrylate/glycidyl methacrylate.

The second layer may comprise ethylene/unsaturated ester copolymer (e.g., any one or more of any of the ethylene/unsaturated ester copolymers discussed in this Application) in an amount of at least about any of the following: 20, 25, 35, 40, 45, 50, 60, 70, 80, 90, 98, and 100 wt. %; and at most about any of the following: 100, 90, 80, 70, 60, 50, 45, 40, 35, and 30 wt. %, based on the weight of the second layer. The second layer may consist of, or consist essentially of, ethylene/unsaturated ester copolymer (including modified ethylene/unsaturated ester copolymer).

The second layer may comprise unmodified ethylene/unsaturated ester copolymer (i.e., ethylene/unsaturated ester copolymer that is not modified as discussed below) in any of the amounts set forth in the previous paragraph.

Modified Ethylene/Unsaturated Ester Copolymer

The second layer may comprise modified ethylene/unsaturated ester copolymer. Modified ethylene/unsaturated ester copolymer includes ethylene/unsaturated ester copolymers (i.e., any of the ethylene/unsaturated ester copolymers described in the previous section of this Application), which are modified (e.g., grafted) with unsaturated carboxylic acid anhydride (i.e., anhydride-modified polymer) to incorporate anhydride functionality. The modification may promote or enhance the adhesion characteristics of the copolymer. Examples of unsaturated carboxylic acid anhydrides include maleic anhydride, fumaric anhydride, and unsaturated fused ring carboxylic acid anhydrides (e.g., as described in U.S. Pat. No. 4,087,588).

Examples of modified ethylene/unsaturated ester copolymer include: maleic anhydride-grafted ethylene/vinyl acetate copolymer having a vinyl acetate comonomer content of about 25 wt. % available from DuPont Corporation under the BYNEL 3861 trademark; maleic anhydride modified ethylene/vinyl acetate copolymer having a vinyl acetate monomer content of about 28 wt. % available from DuPont Corporation under the FUSABOND MC250D trade name; and ethylene/alkyl acrylate/maleic anhydride copolymers, such as ethylene/ethyl acrylate/maleic anhydride copolymer containing 27.5 wt. % acrylate comonomer content and 2.9 wt/% maleic anhydride ("MAH") comonomer content; and ethylene/ethyl acrylate/maleic anhydride copolymer containing 20% acrylate comonomer content and 3% MAH comonomer content.

Modified ethylene/unsaturated ester copolymer may be made by grafting or copolymerization, as is known in the art. Useful anhydride-modified polymers may contain anhydride moiety in an amount (based on the weight of the modified polymer) of at least about any of the following: 0.1%, 0.5%, 1%, and 2%; and at most about any of the following: 10%, 7.5%, 5%, and 4%.

The second layer may comprise modified ethylene/unsaturated ester copolymer in an amount of at least about any of the following: 5, 10, 15, 20, 25, 30, 35, 40, 45, 50, 60, 70, 80, and 90 wt. %; and at most about any of the following: 100, 90, 80, 70, 60, 50, 45, 40, 35, and 30 wt. %, based on the weight of the second layer. The second layer may comprise modified ethylene/unsaturated ester copolymer and unmodified ethylene/unsaturated ester copolymer totaling any of the amounts set forth in the previous sentence.

Styrenic Block Copolymer

The second layer may comprise styrenic block copolymer ("SBC"). Styrenic block copolymer includes styrene/butadiene/styrene copolymer ("SBS"), styrene/isoprene/styrene copolymer ("SIS"), styrene/ethylene-butylene/styrene copolymer ("SEBS"), styrene/ethylene-propylene/styrene ("SEPS"), and styrene/ethylene-propylene copolymer ("SEP").

SBC (e.g., any of the specific SBCs identified herein) may have a styrene comonomer content of at most about any of the following: 73, 70, 65, 60, 55, 50, 45, 40, 35, 32, 30, 28, 25, 20, and 15 wt. %; and at least about any of the following: 10, 12, 15, 20, 25, 28, 30, 32, 35, 40, 50, 60, and 70 wt. %, based on the weight of the SBC. The styrene comonomer content may also range between two or more ranges of the forgoing values, for example, from about 40 to about 70 wt. % and from about 12 to about 35 wt. %.

SBS may have a butadiene comonomer content of at most about any of the following: 30, 40, 50, 60, 65, 68, 70, 72, 75, 80, 85, 88, and 90 wt. %; and at least about any of the following: 27, 30, 35, 50, 60, 65, 68, 70, 72, 75, 80, and 85 wt. %, based on the weight of the SBS. The butadiene comonomer content may range between two or more ranges of the forgoing values, for example, from about 65 to about 75 wt. % and from about 30 to 65 wt. %.

SIS may have a isoprene comonomer content of at most about any of the following: 30, 40, 50, 60, 65, 68, 70, 72, 75, 80, 85, 88, and 90 wt. %; and at least about any of the following: 27, 30, 35, 50, 60, 65, 68, 70, 72, 75, 80, and 85 wt. %, based on the weight of the SIS. The isoprene comonomer content may range between two or more ranges of the forgoing values, for example, from about 65 to about 75 wt. % and from about 30 to 65 wt. %.

SBC (e.g., SBS, SIS) may comprise a substantially unsaturated elastomeric midblock (e.g., butadiene or isoprene comonomer midblock). These types of SBC are available from Kraton Polymers under the KRATON D trade name. For example, a linear SBS is available under the KRATON D2104 trade name (32% styrene content). SIS is also available from Kuraray Company under the HYBRAR trade name (e.g., HYBRAR 7125F).

SBC (e.g., SEBS, SEPS) may have a substantially saturated midblock. These types of SBC are available from Kraton Polymers under the KRATON G trade name. SEP, SEPS, and SEBS are also available from Kuraray Corporation under the SEPTON trade name.

SBC (e.g., SEBS, SEPS) may be modified (i.e., maleic anhydride grafted) as discussed in the "modified ethylene/unsaturated ester copolymer" section of this Application. Modified SBC (e.g., modified SEBS, modified SEPS) are available from Kraton Polymers under the KRATON FG trade name.

The second layer may comprise SBC (e.g., any one or more of any of the types of SBC discussed herein) in an amount of at least about any of the following: 30, 35, 40, 45, 50, 55, 60, 70, 75, 80, 85, 90, 95, 98, and 100 wt. %; and at most about any of the following: 100, 90, 80, 70, 60, 50, 45, 40, and 35 wt. %, based on the weight of the second layer. The second layer may consist of, or consist essentially of, SBC.

Third Layer of the Article

The article may comprise a third layer. The third layer may be directly adjacent the second layer, so that the second layer directly ties the first and third layers. The third layer may comprise any of the following polymers: polyolefin, polyester, polyamide, and polystyrene. The third layer may comprise any one or more of the polyolefin, polyester, polyamide, and polystyrene polymers described herein in at least about, and/or at most about, any of the following amounts: 40, 50, 60, 70, 80, 90, 95, 98, and 100 wt. %, based on the weight of the third layer. The third layer may comprise less than about any of the following amounts of polylactic acid, based on the weight of the third layer: 50, 45, 40, 35, 30, 20, 10, 5, and 1 wt. %. The third layer may be essentially devoid of polylactic acid. The third layer may be an outer layer of the article.

Polyolefin

The third layer may comprise polyolefin. Polyolefin includes polymer having at least about 50 mole % olefin monomer. Polyolefin includes polyethylene (e.g., polyethylene homopolymers, polyethylene copolymers, heterogeneous polyethylene, homogeneous polyethylene, ethylene/alpha-olefin copolymers or "EAOs"), polypropylene (e.g., polypropylene homopolymers, polypropylene copolymers), propylene/ethylene copolymer, and ethylene/cyclic olefin copolymer, and ethylene/unsaturated ester copolymers such as ethylene/vinyl acetate copolymers.

Polyethylene homopolymers include high density polyethylene ("HDPE") and low density polyethylene ("LDPE"). Polyethylene copolymers include ethylene/alpha-olefin copolymer ("EAO") and ethylene/unsaturated ester copolymer.

EAOs are copolymers of ethylene and one or more alpha-olefins, the copolymer having ethylene content as the majority mole-percentage content. The comonomer alpha-olefin may be selected from one or more of any of the $C_3$-$C_{20}$ α-olefins, such as the $C_4$-$C_{12}$ α-olefins, the $C_4$-$C_8$ α-olefins, 1-butene, 1-hexene, and 1-octene. EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs.

Polyester

The third layer may comprise polyester, such as modified polyester. Exemplary modified polyester includes glycol-modified polyester and acid-modified polyester. Modified polyesters are made by polymerization with more than one type of comonomer in order to disrupt the crystallinity and thus render the resulting polyester more amorphous.

Polyester includes polymers made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (which includes their derivatives such as anhydrides or simple esters like methyl esters) include aromatic dicarboxylic acids and derivatives (e.g., terephthalic acid, isophthalic acid, dimethyl terephthalate, dimethyl isophthalate, naphthalene-2,6-dicarboxylic acid); and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Representative dicarboxylic acids may be represented by the general formula:

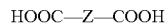

where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T"). As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, bisphenol A, and cyclohexane dimethanol ("CHDM").

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid of the polyester may be at least about any the following: 70, 75, 80, 85, 90, and 95%.

A glycol-modified polyester is a polyester derived by the condensation of at least one polyfunctional carboxylic acid with at least two types of polyfunctional alcohols. For example, glycol-modified poly(ethylene terephthalate) or "PETG" may be made by condensing terephthalic acid with ethylene glycol and cyclohexane dimethanol ("CHDM"). A useful PETG is available from Eastman Corporation under the Eastar 6763 trade name, and is believed to have about 34 mole % CHDM monomer content, about 16 mole % ethylene glycol monomer content, and about 50 mole % terephthalic acid monomer content. Another useful glycol-modified polyester may be made similar to PETG, but substituting dimethyl terephthalate for the terephthalic acid component. Another exemplary glycol-modified polyester is available under the Ecdel 9965 trade name from Eastman Corporation, and is believed to have a density of 1.13 g/cc and a melting point of 195° C. and to be derived from dimethyl 1,4 cyclohexane-dicarboxylate, 1,4 cyclohexane-dimethanol, and poly (tetramethylene ether glycol).

Exemplary acid-modified polyester may be made by condensation of at least one polyfunctional alcohol with at least two types of polyfunctional carboxylic acids. For example, at least one of the polyfunctional alcohols listed above may be condensed with two or more of the polyfunctional carboxylic acids listed above (e.g., isophthalate acid, adipic acid, and/or Naphthalene-2,6-dicarboxylic acid). An exemplary acid-modified polyester may be derived from about 5 mole % isophthalic acid, about 45 mole % terephthalic acid, and about 50 mole % ethylene glycol, such as that available from Invista Corporation.

The modified polyester may be selected from random polymerized modified polyester or block polymerized polyester.

The modified polyester may be derived from one or more of any of the constituents discussed above. If the modified polyester includes a mer unit derived from terephthalic acid, then such mer content (mole %) of the diacid of the polyester may be at least about any the following: 70, 75, 80, 85, 90, and 95%.

Polyamide

The third layer may comprises polyamide. Useful polyamide includes those of the type that may be formed by the polycondensation of one or more diamines with one or more diacids and/or of the type that may be formed by the polycondensation of one or more amino acids (including those provided by the ring opening polymerization of lactams). Useful polyamides include aliphatic polyamides and aliphatic/aromatic polyamides.

Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4, I"), polyhexamethylene isophthalamide ("nylon-6,I"), poly-hexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids (including the ring opening of lactams) include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly(10-aminodecanoic acid) ("nylon-10"), poly(10-aminoundecanoic acid) ("nylon-11"), and poly(12-aminododecanoic acid) ("nylon-12").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethylene-azelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6, 10, and nylon-6,I/6,T.

Polystyrene

The third layer may comprise polystyrene. Exemplary polystyrene includes stryrene homo- and co-polymers. The polystyrene may be substantially atactic, syndiotactic or isotactic. The term "polystyrene" includes copolymer that contains at least 50 mole % monomer units derived from styrene. Styrene may be copolymerized with alkyl acrylates, maleic anhydride, isoprene, or butadiene (i.e., the styrene may be styrene/butadiene copolymer). "Copolymer" as used in this application means a polymer derived from two or more types of monomers, and includes terpolymers, etc. Styrene copolymers with isoprene and butadiene may be further hydrogenated.

Exemplary polystyrene includes styrene/butadiene block copolymer available from BASF under the Styrolux 656C trade name and styrene/butadiene copolymer available from Amco Corporation under the Amaloy B1119 trade name believed to have a 75 mole % styrene content and a 25 mole % butadiene content). Useful styrene/butadiene copolymer may have a styrene content of at least about, and/or at most about, any of the following mole percentages: 65, 70, 75, 80, 85, 90, and 95%. Useful polystyrene may also include high-impact polystyrene ("HIPS").

Article

Representative embodiments of the article of the present invention include films, sheets, and thermoformed articles such as trays. A tray may, for example, be thermoformed from a sheet.

Film

The article may be a film, i.e., a multilayer film, wherein the first, second, and third layers of the article are the first, second, and third layers of the film, respectively. The film may comprise at least any of the following numbers of layers: 2, 3, 4, 5, 7, 9; and may comprise at most any of the following numbers of layers: 2, 3, 4, 5, 6, 7, 8, 9, 11, 13, and 15. The term "layer" in conjunction with a film refers to a discrete film component which is substantially coextensive with the film and has a substantially uniform composition. Where two or more directly adjacent layers have essentially the same composition, then these two or more adjacent layers may be considered a single layer for the purposes of this Application.

The film may have a total thickness of at least about, and/or at most about, any of the following: 1, 2, 3, 4, 5, 7, 9, 10, 12, and 15. As used herein, a film has a thickness of at most about 15 mils; and a sheet has a thickness of greater than about 15 mils.

Any of the first, second, and third layers of the film may be an internal layer of the film. An "internal layer" is a layer of the film that is between two other layers of the film.

Any of the first, second, and third layers of the film may be an outer layer of the film. An "outer layer" of a multilayer film is a layer that has only one side directly adhered to another layer of the film. For multilayered films, there inherently exists two outer layers of the film. For a monolayer film, the sole layer may be considered an outer layer.

An "outside layer" is an outer layer of the film that is, or is intended to be, facing outwardly from a label or package comprising the film. An "inside layer" of a film is an outer layer of the film that is, or is intended to be, facing inwardly from a label comprising the film (i.e., toward the labeled item) or from a package comprising the film (i.e., toward the package interior space).

An outer layer may be adapted to function as a sealant layer, for example, a layer adapted to facilitate heat sealing the film to itself or another structure. A sealant layer may be an inside layer of a film.

The additional layers of the film (i.e., the layers other than the layers comprising the blend) may comprise one or more thermoplastic polymers, for example, polyolefins, polystyrenes, polyurethanes, polyamides, polyesters, and ionomers.

Below are some examples of combinations in which the alphabetical symbols designate the film layers. Where the multilayer film representation below includes the same letter more than once, each occurrence of the letter may represent the same composition or a different composition within the class that performs a similar function.

A/B, A/B/C, A/A/B/C, D/A/B/C, A/B/C/D, D/A/B/C/D, A/B/B, A/A/B, A/B/B/C, A/A/B/B, A/A/B/B/C, D/A/B/B/C/D, D/A/B/D, C/B/A/B/C

"A" represents the first layer of the film, as discussed above (i.e., comprising polylactic acid).

"B" represents the second layer, which in a film having three or more layers may function as a tie layer, that is, a layer having a primary function of improving the adherence of the first layer to the third layer.

"C" represents the third layer of the film, as discussed above.

"D" represents one or more additional layers, for example, comprising any of polyolefins, polystyrenes, polyurethanes, polyamides, polyesters, and ionomers.

Any of the layers of the film may have a thickness of at least about, and/or at most about, any of the following: 0.05, 0.1, 0.5, 1, 1.3, 1.5, 2, 2.5, 3, 4, 5, and 6 mils. Any of the layers of the film may have a thickness as a percentage of the total thickness of the film of at least about, and/or at most about, any of the following: 1, 3, 5, 7, 10, 15, 20, 25, 30, 35, 40, 45, and 50 percent.

Interlayer Bond Strength

The term "interlayer bond strength" as used herein means the average maximum amount of force required to separate or delaminate two adjacent film layers either by adhesive failure between the layers or by cohesive failure through one of the two adjacent film layers (whichever occurs first), as measured in accordance with ASTM F88 where the testing machine (e.g., Instron tensile tester) crosshead speed is 5 inches per minute, using five, 1-inch wide, representative samples and a test temperature of room temperature (i.e., about 68° F.), unless otherwise specified below. ASTM F88 is incorporated herein in its entirety by reference. To prepare a film sample for a test of the interlayer bond strength between two specified layers, a portion of the film may be separated at the interface between the specified layers to provide specimen legs for insertion into the grips of the testing machine. For example, pressure-sensitive adhesive tape may be adhered to opposite outer sides of the film to leave a gripping tab of tape extending from each side of the film. The tabs may then be grasped and yanked in opposite directions to partially separate film layers.

As used herein, an "adhesive failure" is a failure in which the interfacial forces (e.g., valence forces or interlocking action or both) holding two surfaces together are overcome. A "cohesive failure" is one in which the molecular attractive forces holding together a layer composition are overcome. The interlayer bond strength between the first and second layers of the film may be at least about any of the following values: 2, 3, 4, 5, 6, 7, 8, 9, 10, and 12 pounds/inch.

Appearance Characteristics of the Film

The haze of the film may be at most about, and/or at least about, any of the following values: 40%, 30%, 25%, 20%, 15%, 10%, 8%, 5%, and 3%. Haze is a measurement of the transmitted light scattered more than 2.5° from the axis of the incident light. Haze is measured against an outer layer of the film (i.e., the outside layer). The film may have any of the these haze values where the haze is measured against an outer layer comprising the blend. Haze is measured according to the method of ASTM D 1003, which is incorporated herein in its entirety by reference. All references to "haze" values in this Application are by this standard.

The film may have a gloss (i.e., specular gloss) as measured against the outer layer (i.e., the outside layer) of at least about, and/or at most about, any of the following values: 40%, 50%, 60%, 63%, 65%, 70%, 75%, 80%, 85%, 90%, and 95%. The film may have any of the these gloss values where the gloss is measured against an outer layer comprising the blend. These percentages represent the ratio of light reflected from the sample to the original amount of light striking the sample at the designated angle. All references to "gloss" values in this Application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film may be at least about, and/or at most about, any of the following values: 30%, 40%, 50%, 65%, 70%, 75%, 80%, 85%, and 90%, measured in accordance with ASTM D1746. All references to "regular transmittance" or "clarity" values in this Application are by this standard.

The total luminous transmittance (i.e., total transmittance) of the film may be at least about, and/or at most about, any of the following values: 30%, 40%, 50%, 65%, 70%, 75%, 80%, 85%, and 90%, measured in accordance with ASTM D1003. All references to "total luminous transmittance" values in this Application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993).

Film Density

The film may have a density (at 23° C.) of at most about, and/or at least about, any of the following: 1.10, 1.05, 1.00, 0.98, 0.96, and 0.94 grams/cubic centimeter. The density of the film is measured according to ASTM D792. If the density of the label film (discussed below) is less than that of water, while the density of the bottle (e.g., a PET bottle) is greater than that of water, then it may be possible for recycle separation of the plastic of the bottle from the plastic of the label comprising the film by using a water float separation technique in which the label plastic floats and the bottle plastic sinks. On the other hand, if the density of the label film is greater than that of water, while the density of the bottle (e.g., a polyolefin bottle such as an HDPE bottle) is less than that of water, then it may be possible for recycle separation of the plastic of the bottle from the plastic of the label comprising the film by using a water float separation technique in which the label plastic sinks and the bottle plastic floats. The density of the film may be adjusted by varying the relative amounts of components, for example, by varying the amount of polyolefin in the film.

Modulus of the Film

The film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. The film may have a Young's modulus of at least about, and/or at most about, any of the following: 60,000; 100,000; 130,000; 150,000; 200,000; 250,000; 300,000; and 350,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

Manufacture of the Film

The film may be manufactured by thermoplastic film-forming processes known in the art. The film may be prepared by extrusion or coextrusion utilizing, for example, a tubular trapped bubble film process, a flat or tube cast film process, or a slit die flat cast film process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) and for example at a temperature below the film's melting point. The film may then be quickly cooled to retain the physical properties generated during orientation and to provide a heat-shrink characteristic to the film. The film may be oriented using, for example, a tenter-frame process or a bubble process. The orientation may occur in any of one direction (i.e., the machine or transverse direction) and/or two directions (e.g., the machine and transverse directions) by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1. The film may be stretched by any of these amounts in one direction and another of any of these amounts in another direction.

The film may have a free shrink at 100° C. in one direction (e.g., the machine direction or the transverse direction) and/or in both the machine and transverse directions of at least about, and/or at most about, any of the following: 5%, 7%, 9%, 10%, 12%, 15%, 25%, 30%, 40%, 45%, 50%, 55%, 60%, 70%, 75%, and 80%. The film may have any of the forgoing shrink amounts in the machine and/or transverse directions at any of the following temperatures: 90, 80, 70, 60, 50, and 40° C. For example, the film may have a free shrink at 80° C. in the transverse direction of at least about 60% and a free shrink at 60° C. in the machine direction of at most about 10%. Also, the film may have any combination of the forgoing shrink values at differing temperatures; for example, the film may have a free shrink at 90° C. in at least one direction of at least about 75% and a free shrink at 70° C. in any direction of at most about 5%. The film may be annealed, for example, to decrease the shrink attribute at a selected temperature (e.g., 70° C.).

The film may be annealed or heat-set to slightly or substantially reduce the free shrink of an oriented film, for example to raise the shrink initiation temperature. The film may have less than about any of 3%, 2%, and 1% free shrink in any direction at any of the following temperatures: 65, 60, 55, 50, 45, and 40° C.

The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

The film may have a printed image applied to it, for example, by any suitable ink printing method, such as rotary screen, gravure, or flexographic techniques. The printed image may be applied to a skin layer. The printed image may be applied as a reverse printed image, for example, applied to the inside layer of the film of a shrink sleeve.

Shrink Sleeve

Figure 2:
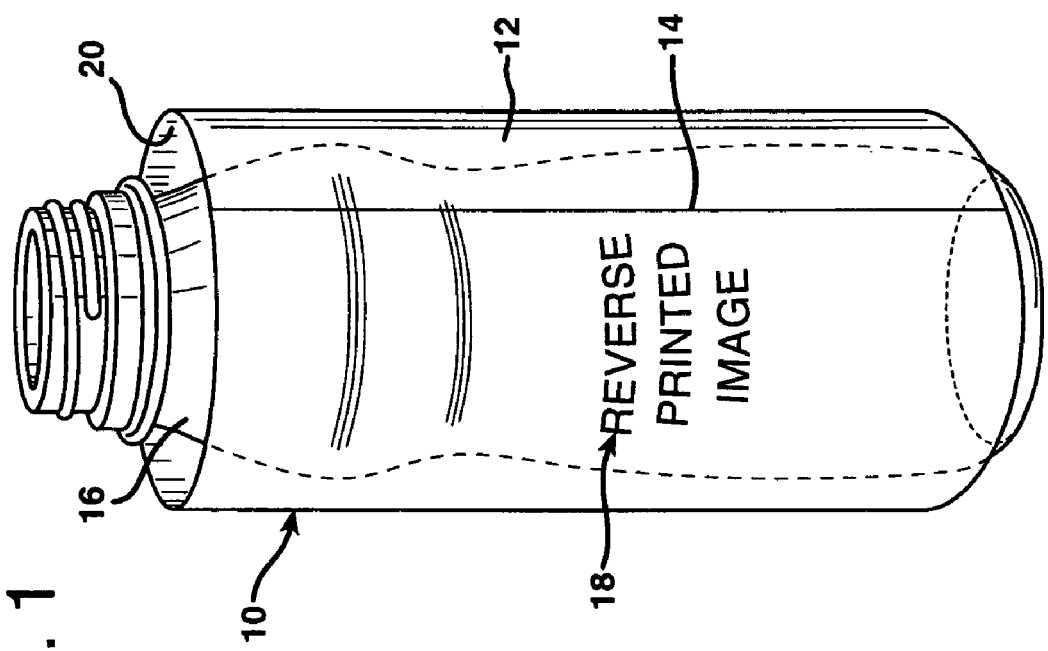
FIG. 2 is a representative perspective view of the shrink sleeve of FIG. 1 shrunk about the container to provide a shrink labeled container.

The article may be a shrink sleeve, e.g. shrink sleeve 10 (also known as a shrink sleeve label or a shrink band) comprising the film 12. (FIGS. 1-2.) The shrink sleeve 10 may be a seamed shrink sleeve (illustrated in FIG. 1), a seamless shrink sleeve, or a roll-fed shrink sleeve (i.e., formed by roll-fed shrink film for wraparound labeling).

A seamed shrink sleeve that comprises the film may be manufactured from a flat configuration of the film, which is seamed into a tube by attaching the film to itself to form a tube having a seam 14 using, for example, an adhesive seam. If the sleeve 10 is to be printed, then the formation of the film into a tube may occur after images have been printed onto the film. The printed image 18 may be applied as a reverse printed image to the inside surface 20. The tube may then be wound onto a core. The roll of tubing may then be unwound from the core and cut to individual lengths to form the individual seamed shrink sleeves. The shrink sleeve may then be placed to surround the item (e.g., container 16) to which the shrink sleeve is to be applied. Heat may then be applied (e.g., by placing the shrink-sleeved item into a heat tunnel using, for example, steam or hot air) so that the heat shrink characteristic of the shrink sleeve is activated and the shrink sleeve shrinks to conform to the shape of the item that the shrink sleeve surrounds, as illustrated in FIG. 2.

A seamless shrink sleeve that comprises the film may be manufactured by extruding the film in a tube configuration having a desired tube configuration. The resulting tube may be printed and cut to desired lengths to form individual shrink sleeves.

A roll-fed shrink sleeve comprising the film may be manufactured by: 1) applying a pick-up adhesive to the leading edge of the film that has been cut into the desired dimensions, 2) adhering the leading edge to a container, 3) moving the container and the film relative each other so that the film surrounds the container, 4) applying an adhesive to the trailing edge of the film, 5) adhering the trailing edge of the film to the container or to the leading edge area of the film, and 6) exposing the shrink sleeve/container to heat to activate the shrink characteristic of the film.

A shrink sleeve comprising the film may be used, for example: 1) as a label applied to an item, 2) as a tamper-evident seal or packaging material (e.g., a tamper-evident neck band), and/or 3) to unitize two or more items (e.g., multi-packing). The shrink sleeve may be a full-body sleeve for enclosing a container. The shrink sleeve may be used to enclose a shaped and/or contoured container (e.g., an asymmetrically-shaped container).

Use of the Film

As discussed above, the article may be a film. A package comprising the film may enclose a product, such as a food product selected from one or more of produce (e.g., vegetables, fruit), cheese, meat products, fresh red meat products, poultry, pork, beef, sausage, and fish. The package may be a bag comprising the film. For example, the film may be formed into a bag, such as by sealing the inside layer to itself in selected regions, or by sealing the inside layer to the outside layer in selected regions (i.e., a lap seal). Useful bags configurations include an end-seal bag, a side-seal bag, an L-seal bag (i.e., sealed across the bottom and along one side with an open top), and a pouch (i.e., sealed on three sides with an open top). The film may be provided in a tubular configuration, in which case only an end seal and a top seal need to be made to form a closed bag.

After forming the bag, the product may be inserted into the bag, and the open end of the bag sealed to enclose the product. The film may also be wrapped around a product and heat sealed to form a package enclosing the product. The film may be used as a wrap to cover and secure a product (e.g., a food product) that rests on a tray. The film may be used as a lid adapted to be sealed to a support (e.g., a tray) for the packaged product.

The package enclosing the product may be subjected to an elevated temperature to activate the heat shrink characteristic of the film so that the film and/or package comprising the film may conform to the contour of the enclosed packaged product. For example, the package may be passed through a hot air or steam tunnel or hot water bath.

The film may have a printed image applied to it, for example, by any suitable ink printing method, such as rotary screen, gravure, or flexographic techniques. The printed image may be applied to one or more layers comprising the blend.

The film may be used as a lid. The film may be used as a package overwrap.

Sheets and Trays

The article may be a sheet. As discussed above, a sheet has a thickness of greater than about 15 mils. The sheet may have a thickness of at least about any of the following values: 16 mils, 18 mils, 20 mils, 23 mils, 26 mils, and 30 mils. The sheet may have a thickness of less than about any of the following values: 60 mils, 50 mils, 40 mils, 35 mils, 30 mils, and 25 mils.

The discussion above with respect to the article as a film—i.e., regarding the number of layers, layer configuration, layer composition, appearance, and manufacture methods—applies as well to the article as a sheet.

The article may be a thermoformed article, such as a tray. The tray may be formed, for example, by thermoforming the sheet to a desired shape. Methods of thermoforming sheets to form trays are well known in the art and are therefore not discussed in detail here.

The following examples are presented for the purpose of further illustrating and explaining the present invention and are not to be taken as limiting in any regard. Unless otherwise indicated, all parts and percentages are by weight.

In the examples below, these abbreviations have the following meanings:

PLA1 is polylactic acid available from NatureWorks LLC under the NATUREWORKS 4032D trade name.

EVA1 is ethylene/vinyl acetate copolymer having an vinyl acetate monomer content of about 50 wt. % and available from Lanxess Corporation under the LEVAMELT 500 trade name.

EVA2 is ethylene/vinyl acetate copolymer having an vinyl acetate monomer content of about 40 wt. % and available from Lanxess Corporation under the LEVAMELT 400 trade name.

EVA3 is ethylene/vinyl acetate copolymer having an vinyl acetate monomer content of about 28 wt. %, a density of about 0.95 g/cm3, and a melting point of about 74° C. available from DuPont under the ELVAX 3182-2 trade name.

EVA4 is ethylene/vinyl acetate copolymer having an vinyl acetate monomer content of about 14.4 wt. %, a density at 23° C. of about 0.93 g/cm3, and a melting point of about 87° C. available from ExxonMobil Corporation under the ESCORENE LD 713.93 trade name.

EVA5 is ethylene/vinyl acetate/methacrylic acid copolymer having a vinyl acetate monomer content of about 18.4 wt. %, a methacrylic acid monomer content of about 2 wt. %, a density of about 0.94 g/cm3, and a melting point of about 87° C. available from DuPont Corporation under the BYNEL 3101 trade name.

mEVA1 is maleic anhydride modified ethylene/vinyl acetate copolymer having a vinyl acetate monomer content of about 28 wt. % available from DuPont Corporation under the FUSABOND MC250D trade name.

mEVA2 is maleic anhydride modified ethylene/vinyl acetate copolymer having a vinyl acetate monomer content of about 25 wt. % and a density of about 0.98 g/cm3 available from Dupont Corporation under the BYNEL 3861 trade name.

mEMA1 is maleic anhydride modified ethylene/methyl acrylate copolymer having a methyl acrylate monomer content of about 18 wt. % and a density of about 0.93 g/cm3 available from Dupont Corporation under the BYNEL 21E810 trade name.

EAO1 is ethylene/octene copolymer comprising about 45 wt. % octene comonomer content available from Dow Corporation under the ENGAGE 8842 trade name.

EVOH1 is ethylene/vinyl alcohol copolymer having a vinyl alcohol monomer content of about 56 mole % available from Evalca/Kuraray Company under the EVAL E151A trade name.

Ionomer1 is ionomer, namely, zinc neutralized ethylene/methacrylic acid copolymer having a density of 0.94 g/cm3, and a melting point of about 90° C. available from DuPont Corporation under the SURLYN 1650 trade name.

PETG1 is glycol-modified poly(ethylene terephthalate) available from Eastman Corporation under the Eastar 6763 trade name, and is believed to have about 34 mole % cyclohexane dimethanol monomer content, about 16 mole % ethylene glycol monomer content, and about 50 mole % terephthalic acid monomer content.

PEC1 is homogeneous propylene/ethylene copolymer available from ExxonMobil Corporation under the VISTAMAXX VM1100 trade name (believed to have a density of 0.860 g/cm3 and an ethylene comonomer content of 13.4 wt. %).

VLDPE1 is single-site catalyzed very low density ethylene/butene polyethylene copolymer available from ExxonMobil under the EXACT 3024 trade name and believed to have a density of about 0.905 g/cm3 and a melting point of about 98° C.

SBS1 is styrene/butadiene/styrene block copolymer having about 27 wt. % styrene comonomer content and 73 wt. % butadiene comonomer content available from Kraton Polymers under the KRATON MD 6932 trade name.

mSEBS1 is maleic anhydride modified (1.7 wt. %) styrene/ethylene-butylene/styrene block copolymer having about 30 wt. % styrene comonomer content available from Kraton Polymers under the KRATON FG 1901 trade name.

mSEBS2 is maleic anhydride modified (1.0 wt. %) styrene/ethylene-butylene/styrene block copolymer having about 13 wt. % styrene comonomer content available from Kraton Polymers under the KRATON FG 1924 trade name.

SBS2 is styrene/butadiene/styrene block copolymer having about 75 wt. % styrene comonomer content and 25 wt. % butadiene comonomer content available from Kraton Polymers under the KRATON MD 6459 trade name.

E/MA/GMA1 is ethylene/methyl acrylate/glycidyl methacrylate copolymer believed to have a methyl acrylate comonomer content of about 24 wt. %, and a glycidyl methacrylate comonomer content of about 8 wt. % available from Arkema Corporation under the LOTADER 8900 trade name.

Examples 1 and 2

An Example 1 film was made having an A/B/A layer configuration, and a total thickness of from about 2 to about 3 mils. Each layer was about one-third of the total thickness. The film was extruded using a Randcastle cast extruder. The outer "A" layers were PLA1. The internal "B" layer was EVA1. The vinyl acetate comonomer content of the EVA1 was 50 wt. % based on the weight of the B layer because the B layer was 100% EVA1.

An Example 2 film was made similar to the Example 1 film, except that the "B" layer was EVA2. The vinyl acetate comonomer content of the EVA2 was 40 wt. % based on the weight of the B layer because the B layer was 100% EVA2.

The bond strengths between the "A" and "B" layers were evaluated as reported in Table 1. For each of the Example 1 and Example 2 films, the bond between the "A" and "B" film layers was so strong that the layers could not be separated from each other in order to measure the interlayer bond strength using an Instron mini55 instrument.

Example 3

An Example 3 film was made having an A/B/A layer configuration, and a total thickness of from about 2 to about 3 mils. Each layer was about one-third of the total thickness. The film was extruded using a Randcastle cast extruder. The outer "A" layers were PLA1. The internal "B" layer was E/MA/GMA1. The unsaturated ester comonomer content based on the weight of the B layer was about 32 wt. % (24 wt. % plus 8 wt. %) because the B layer was 100% E/MA/GMA1.

The bond strengths between the "A" and "B" layers were evaluated and reported in Table 1. For the Example 3 film, the bond between the "A" and "B" film layers was so strong that the layers could not be separated from each other in order to measure the interlayer bond strength using an Instron mini55 instrument.

COMPARATIVES 1 THROUGH 9

Comparative films 1 through 9 were made similar to the Example 1 film, except that the "B" layer was as shown in Table 1. The interlayer bond strength between the "A" and "B" layers of each film was evaluated and are also shown in Table 1.

TABLE 1

| | "B" layer composition | Unsaturated ester comonomer content based on the weight of the "B" layer | Comment regarding the interlayer bond strength between the "A" and "B" layers. |
|---|---|---|---|
| Comparative 1 | EVA3 | about 28 wt. % | Failed within PLA layer.* |
| Comparative 2 | EVA4 | about 14.4 wt % | Delaminated easily; interlayer bond strength of about 0.005 lbf/in |
| Comparative 3 | mEVA1 | about 28 wt. % | Failed within PLA layer.* |
| Comparative 4 | mEVA2 | about 25 wt. % | Failed within PLA layer.* |
| Comparative 5 | EVA5 | about 18.4 wt. % | Failed within PLA layer.* |
| Comparative 6 | mEMA1 | about 18 wt. % | Failed within PLA layer.* |
| Comparative 7 | EVOH1 | 0% | Weak bond - interlayer bond strength of about 0.482 lbf/in |
| Comparative 8 | Ionomer1 | 0% | Delaminated easily - interlayer bond strength of about 0.013 lbf/in |
| Comparative 9 | PETG1 | 0% | Weak bond - interlayer bond strength of about 0.45 lbf/in |
| Example 1 | EVA1 | about 50 wt. % | Strong - layers could not be separated |
| Example 2 | EVA2 | about 40 wt. % | Strong - layers could not be separated |
| Example 3 | E/MA/GMA1 | about 32 wt. % | Strong - layers could not be separated |

*The film failed within the PLA layer, that is, the PLA layer came off in pieces when attempting to use adhesive tape to separate the film layers in order to measure the interlayer bond strength.

Accordingly, the interlayer bond strength was not measured.

Examples 4 Through 6 and Comparatives 10 Through 14

Examples 4 through 6 films and Comparative 10 through 14 films were each 5 made having an C/B/A/B/C layer configuration, and a total thickness of about 4 mils. The B and C layers were each about 0.5 mils thick; and the A layer was about 2 mils thick. The films were extruded using a flat cast extrusion line. The internal "A" layer was PLA1. The outer C layers were VLDPE1. The "B" tie layers were as shown below in Table 2. The interlayer bond strength between the "A" and "B" layers of each film was evaluated and are also shown in Table 2.

TABLE 2

| | "B" layer composition | Unsaturated ester comonomer content based on the weight of the "B" layer | Comment regarding the interlayer bond strength between the "A" and "B" layers. |
|---|---|---|---|
| Example 4 | EVA1 | about 50 wt. % | So strong that the layers could not be separated from each other in order to measure the interlayer bond strength. |
| Example 5 | EVA1 - 50 wt. % EVA3 - 50 wt. % | about 39 wt. % | So strong the layers could not be separated from each other in order to measure the interlayer bond strength. |
| Example 6 | EVA1 - 50 wt. % mEVA2 - 50 wt. % | about 38 wt. % | Interlayer bond strength of about 1.52 lbf/in. |
| Comparative 10 | EVA1 - 20 wt. % EVA3 - 80 wt. % | about 32 wt. % | Interlayer bond strength of about 1.49 lbf/in. |
| Comparative 11 | EVA3 | about 28 wt. % | Interlayer bond strength of about 1.19 lbf/in. |
| Comparative 12 | mEVA2 | about 25 wt. % | Interlayer bond strength of about 0.703 lbf/in. |
| Comparative 13 | mEMA1 | about 18 wt. % | Interlayer bond strength of about 1.71 lbf/in. |
| Comparative 14 | EVA5 | about 18.4 wt. % | Interlayer bond strength of about 0.82 lbf/in. |

Examples 7 Through 12 and Comparatives 15 Through 17

Example 7 through 12 films and Comparative 15 through 17 films were made having an A/B/A layer configuration, and a total thickness of from about 2 to about 3 mils. Each layer was about one-third of the total thickness. The film was extruded using a Randcastle cast extruder. The outer "A" layers were PLA1. The internal "B" layer was as set forth in Table 3. The interlayer bond strength between the "A" and "B" layers of each film was evaluated and are also shown in Table 3.

TABLE 3

| | "B" layer composition | Styrene comonomer content based on the weight of the "B" layer | Butadiene comonomer content based on the weight of the "B" layer | Comment regarding the interlayer bond strength between the "A" and "B" layers. |
|---|---|---|---|---|
| Example 7 | SBS1 | 27 wt. % | 73 wt. % | So strong that the layers could not be separated from each other in order to measure the interlayer bond strength. |
| Example 8 | mSEBS1 | 30 wt. % | | So strong that the layers could not be separated from each other in order to measure the interlayer bond strength. |
| Example 9 | mSEBS2 | 13 wt. % | | So strong that the layers could not be separated from each other in order to measure the interlayer bond strength. |

TABLE 3-continued

|  | "B" layer composition | Styrene comonomer content based on the weight of the "B" layer | Butadiene comonomer content based on the weight of the "B" layer | Comment regarding the interlayer bond strength between the "A" and "B" layers. |
|---|---|---|---|---|
| Example 10 | SBS1 - 50 wt. % SBS2 - 50 wt. % | 51 wt. % | 49 wt. % | So strong that the layers could not be separated from each other in order to measure the interlayer bond strength. |
| Example 11 | SBS1 - 25 wt. % SBS2 - 75 wt. % | 63 wt. % | 37 wt. % | Strong bond; difficult to separate using tape, so bond strength not measured |
| Example 12 | SBS1 - 10 wt. % SBS2 - 90 wt. % | 70 wt. % | 30 wt. % | Strong bond; difficult to separate using tape, so bond strength not measured |
| Compare 15 | SBS2 | 75 wt. % | 25 wt. % | Delaminated easily, very weak bond (not measured) |
| Compare 16 | PEC1 | 0% | 0% | Interlayer bond strength of about 116 gmf/in (about 0.26 lbf/in) |
| Compare 17 | EAO1 | 0% | 0% | Interlayer bond strength of about 4.4 gmf/in (about 0.01 lbf/in) |

The Example 7 film had very low haze, that is, less than 5% haze.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. An article comprising:
   a first layer comprising polylactic acid;
   a second layer directly adjacent the first layer, the second layer comprising ethylene/unsaturated ester copolymer, wherein the unsaturated ester comonomer content of the ethylene/unsaturated ester copolymer is at least about 35 wt. % based on the weight of the second layer.

2. The article of claim 1 wherein the first layer comprises at least about 50 wt. % polylactic acid based on the weight of the first layer.

3. The article of claim 1 wherein the first layer comprises at least about 90 wt. % polylactic acid based on the weight of the first layer.

4. The article of claim 1 wherein the first layer comprises at least about 95 wt. % polylactic acid polylactic acid based on the weight of the first layer.

5. The article of claim 1 wherein the second layer comprises at least about 50 wt. % of ethylene/unsaturated ester copolymer based on the weight of the second layer.

6. The article of claim 1 wherein the second layer comprises at least about 80 wt. % of ethylene/unsaturated ester copolymer based on the weight of the second layer.

7. The article of claim 1 wherein the unsaturated ester comonomer content of the ethylene/unsaturated ester copolymer is at least about 39 wt. % based on the weight of the second layer.

8. The article of claim 1 wherein the unsaturated ester comonomer content of the ethylene/unsaturated ester copolymer is at least about 40 wt. % based on the weight of the second layer.

9. The article of claim 1 wherein the unsaturated ester comonomer content of the ethylene/unsaturated ester copolymer is at least about 43 wt. % based on the weight of the second layer.

10. The article of claim 1 wherein the unsaturated ester comonomer content of the ethylene/unsaturated ester copolymer is at least about 50 wt. % based on the weight of the second layer.

11. The article of claim 1 wherein the unsaturated ester comonomer content of the ethylene/unsaturated ester copolymer is at most about 75 wt. % based on the weight of the second layer.

12. The article of claim 1 wherein the unsaturated ester comonomer content of the ethylene/unsaturated ester copolymer is at most about 70 wt. % based on the weight of the second layer.

13. The article of claim 1 wherein the unsaturated ester comonomer content of the ethylene/unsaturated ester copolymer is at most about 80 wt. % based on the weight of the second layer.

14. The article of claim 1 wherein the ethylene/unsaturated ester copolymer comprises anhydride-modified ethylene/unsaturated ester copolymer.

15. The article of claim 1 wherein:
the ethylene/unsaturated ester copolymer comprises vinyl ester of aliphatic carboxylic acid comonomer having from 4 to 12 carbon atoms; and
the unsaturated ester comonomer content of the ethylene/unsaturated ester copolymer is at least about 39 wt. % based on the weight of the second layer.

16. The article of claim 15 wherein the vinyl ester of aliphatic carboxylic acid comonomer comprises vinyl acetate comonomer.

17. The article of claim 1 wherein:
the ethylene/unsaturated ester copolymer comprises alkyl (meth)acrylate comonomer having from 4 to 12 carbon atoms; and
the unsaturated ester comonomer content of the ethylene/unsaturated ester copolymer is at least about 39 wt. % based on the weight of the second layer.

18. The article of claim 17 wherein the unsaturated ester comprises alkyl (meth)acrylate comonomer having from 4 to 8 carbon atoms.

19. The article of claim 17 wherein the alkyl (meth)acrylate comonomer comprises one or more comonomers selected from one or more of methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate.

20. The article of claim 1 further comprising a third layer comprising less than about 50% polylactic acid by weight of the third layer, wherein the third layer is directly adjacent the second layer.

21. The article of claim 20 wherein the third layer comprises at least about 50% by weight of the third layer of one or more polymers selected from polyolefin, polyester, polystyrene, and polyamide.

22. The article of claim 21 wherein third layer comprises one or more polyolefins selected from polyethylene, polypropylene, propylene/ethylene copolymer, ethylene/cyclic olefin copolymer, and ethylene/vinyl acetate copolymer.

23. The article of claim 20 wherein the article is a multilayer film.

24. The article of claim 23 wherein the first layer is an outer layer of the multilayer film.

25. The article of claim 23 wherein the first layer is an internal layer of the multilayer film.

26. The article of claim 23 wherein the second layer is an internal layer of the multilayer film.

27. The article of claim 23 wherein the third layer is an outer layer of the multilayer film.

28. The article of claim 23 wherein the multilayer film has a free shrink at 100° C. in at least one direction of at least about 10%.

29. The article of claim 28 wherein the total density of the multilayer film is less than about 1 g/cc.

30. The article of claim 28 wherein the total density of the multilayer film is greater than about 1 g/cc.

31. The article of claim 23 wherein the multilayer film has a haze of at most about 30%.

32. The article of claim 20 wherein the article is a sheet.

* * * * *